United States Patent
Bono et al.

(10) Patent No.: US 9,778,996 B1
(45) Date of Patent: Oct. 3, 2017

(54) FILE SYSTEM VERSION SET INFRASTRUCTURE

(71) Applicant: EMC Corporation, Hopkinton, MA (US)

(72) Inventors: Jean-Pierre Bono, Westborough, MA (US); William C. Davenport, Burlington, MA (US); Alexander Mathews, Jamesburg, NJ (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 629 days.

(21) Appl. No.: 14/319,602

(22) Filed: Jun. 30, 2014

(51) Int. Cl.
*G06F 17/30* (2006.01)
*G06F 11/14* (2006.01)

(52) U.S. Cl.
CPC ................ *G06F 11/1458* (2013.01)

(58) Field of Classification Search
CPC ............. G06F 11/1458; G06F 2201/84; G06F 11/2094; G06F 11/1435; G06F 17/30088; G06F 17/30215; G06F 17/30575; G06F 11/1446; G06F 17/30165; G06F 17/30221
USPC ........................................................ 707/749
See application file for complete search history.

(56) References Cited

U.S. PATENT DOCUMENTS

| | | | |
|---|---|---|---|
| 7,631,155 B1 | 12/2009 | Bono et al. | |
| 7,761,456 B1* | 7/2010 | Cram | G06F 11/1435 707/754 |
| 7,818,535 B1* | 10/2010 | Bono | G06F 12/0868 711/173 |
| 8,612,382 B1 | 12/2013 | Patel et al. | |
| 2005/0065986 A1 | 3/2005 | Bixby et al. | |
| 2009/0144342 A1* | 6/2009 | Sudhakar | G06F 17/3023 |

* cited by examiner

*Primary Examiner* — Evan Aspinwall
(74) *Attorney, Agent, or Firm* — BainwoodHuang

(57) ABSTRACT

A technique for managing file systems assigns groups of related files in a file system to respective version sets. Each version set includes all files of a file system that are related to one another by one or more snapshot operations. The technique provides a version set database, which stores, in connection with each version set, an identifier of each file that belongs to the respective version set. In an example, file system operations that require information about block sharing can perform lookup operations on the version set database to narrow the scope of files that are candidates for block sharing to those of a particular version set.

19 Claims, 10 Drawing Sheets

FILE SYSTEM VERSION SET INFRASTRUCTURE

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Data storage systems often implement snapshot technology to protect the data they store. For example, a data storage system may serve a data object to various client machines. The client machines access the data object over a network and can make changes to its contents over time. To protect the data object and its state at various points in time, the data storage system may implement a snapshot policy and take snapshots, or "snaps," of the data object at regular intervals or in response to user commands or particular events. Each snapshot provides a point-in-time version of the data object, which users of client machines can access to restore from a previous version of the data object, such as to resume use of an object from a previous, known-good state. Users may also restore from snaps to examine previous states of data objects, such as for forensic purposes.

To conserve physical storage space, data storage systems often employ block sharing relationships among data objects and their snaps. As is known, a "block" is an allocatable unit of storage, which may, for example, be 8 KB in size, although blocks can be of any size. Block sharing saves storage space by storing common data used by different files on the same blocks, rather than requiring each file to have its own blocks even when the data on the blocks are the same. Data storage systems can take snaps of many different types of data objects, including file systems, LUNs (Logical Unit Numbers), vVOLs (virtual volumes), VMDKs (virtual machine disks), VHD's (Virtual Hard Disks), and other types of objects.

SUMMARY

Users of data storage systems expect data storage systems to serve ever-increasing numbers of data objects and their respective snaps. One proposed implementation requires a data storage system to serve thousands of VMDKs and their respective snaps from a single file system. The file system stores each VMDK and each snap as a respective file. Hosts can access the VMDK files or their snaps over a network, for example, to operate respective virtual machines.

Unfortunately, conventional file systems do not operate efficiently in the face of thousands of data objects, each having potentially thousands of snaps. What is needed is a way of simplifying the management of file systems, so that file systems can perform their operations efficiently even in the presence of very large numbers of data objects and snaps.

In contrast with conventional file system technologies, an improved technique for managing file systems assigns groups of related files in a file system to respective version sets. Each version set includes all files of the file system that are related to one another by one or more snapshot operations. Thus, a version set may include an initial, primary object, such as a VMDK, as well as all snaps of that object. Files within a version set are thus all related by snaps, while files across different version sets are not related by snaps. Version sets promote the efficiency of many file system operations by grouping together files that may have block-sharing relationships while separating files that may not have block-sharing relationships. An infrastructure for supporting version sets includes a version set database, which stores, in connection with each version set, an identifier of each file that belongs to the respective version set. File system operations that require information about block sharing can perform lookup operations on the version set database to narrow the scope of files that are candidates for block sharing to those of a particular version set, thus promoting efficiency in file system operations.

Certain embodiments are directed to a method for managing file systems. The method includes storing a file system on storage blocks backed by a set of storage devices, the file system including a set of files, each of the set of files belonging to one of multiple version sets, each version set including a distinct subset of the set of files that form one or more nodes of a respective snapshot tree of files. At least one snapshot tree of files include multiple files that share among them one or more of the storage blocks. The method further includes organizing the version sets in a version set database, the version set database storing, in connection with each of the version sets, an identifier of each file that belongs to the respective version set. The method still further includes, in response to a processor encountering an instruction to execute a file system operation involving a specified version set, performing a lookup operation on the version set database to obtain a list of files of the file system that belong to the specified version set.

Other embodiments are directed to a data storage apparatus constructed and arranged to perform the method described above. Still other embodiments are directed to a computer program product. The computer program product includes one or more non-transient, computer-readable media that stores instructions which, when executed on one or more processing units of a data storage apparatus, cause the data storage apparatus to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing file systems assigns groups of related files in a file system to respective version sets. Each version set includes all files of the file system that are related to one another by one or more snapshot operations. A version set database stores, in connection with each version set, an identifier of each file that belongs to the respective version set. In an example, file system operations that require information about block sharing can thus perform lookup operations on the version set database to narrow the scope of files that are candidates for block sharing to those of a particular version set.

Figure 1:
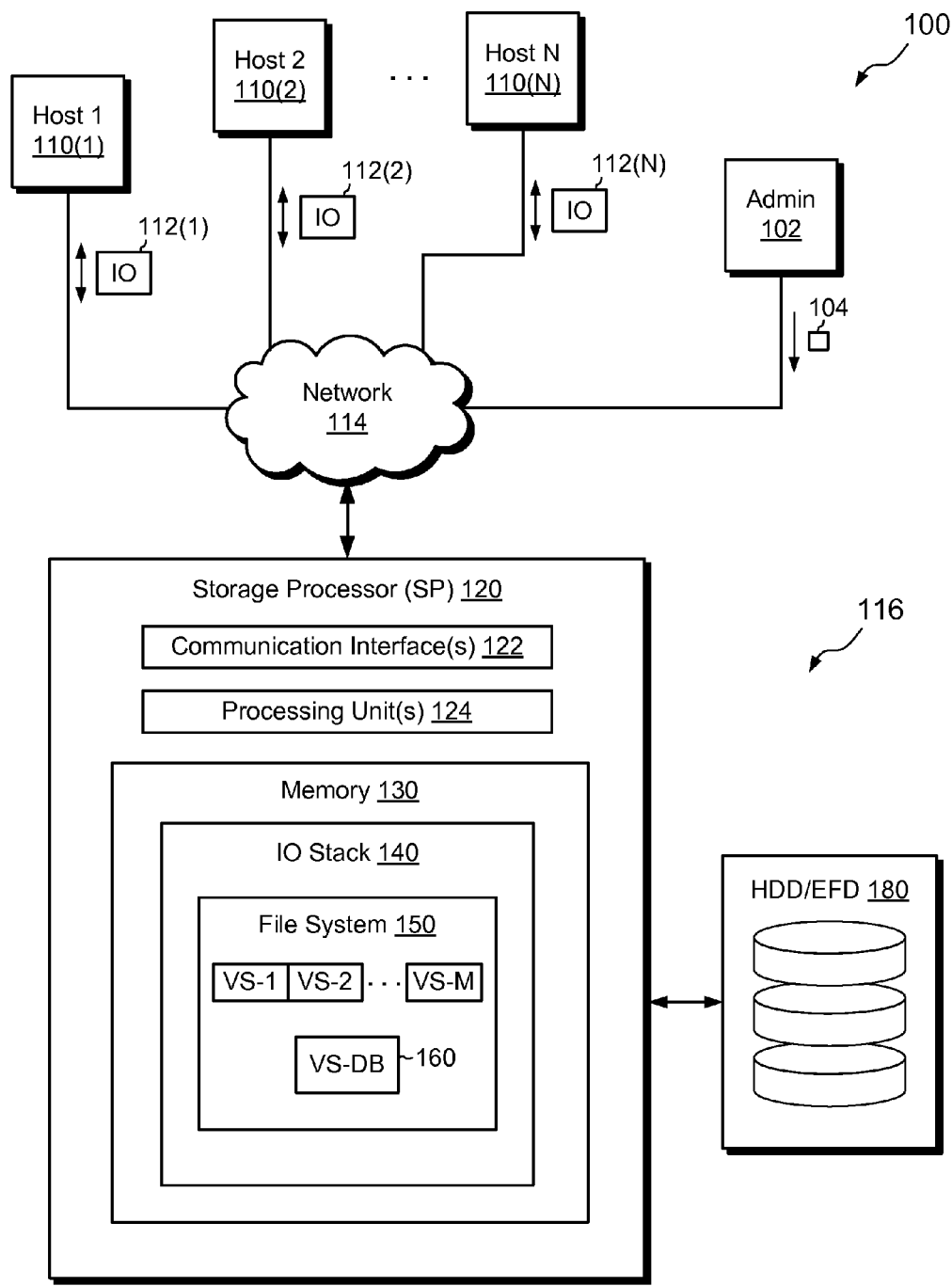
FIG. 1 is a block diagram of an example environment in which the improved technique hereof may be practiced.

FIG. 1 shows an example electronic environment 100 in which embodiments of the improved technique hereof can be practiced. Here, multiple host computing devices ("hosts") 110(1) through 110(N) access a data storage apparatus 116 over a network 114. The data storage apparatus 116 includes a storage processor, or "SP," 120 and storage 180. The storage 180 is provided, for example, in the form of hard disk drives and/or electronic flash drives. The data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the hosts 110(1-N) can connect to the SP 120 using various technologies, such as Fibre Channel (e.g., through a SAN), iSCSI, NFS, SMB 3.0, and CIFS. Any number of hosts 110(1-N) may be provided, using any of the above protocols, some subset thereof, or other protocols besides those shown. The SP 120 is configured to receive IO requests 112(1-N) and to respond to such IO requests 112(1-N) by reading and/or writing the storage 180. An administrative machine 102 may also communicate over the network 114 with the SP 120, e.g., via requests 104.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140. The IO stack 140 provides an execution path for host IOs (e.g., IO requests 112(1-N)) and includes an internal representation of a file system 150. It should be understood that the file system 150 is a logical construct within the IO stack 140 and that the underlying data and metadata that support the file system 150 typically reside in the storage 180. Although only a single file system 150 is shown, it should be understood that SP 120 may host any number of file systems, like the file system 150, limited only by available computing resources and storage.

The file system 150 is seen to include multiple version sets, VS-1 through VS-M, and a version set database 160 (VS-DB). Each of the version sets VS-1 through VS-M includes one or more files that belong to a respective snapshot tree of files, meaning that the files (if greater than one is provided) are related by snapshot operations. Files within a version set may thus have block-sharing relationships with other files within the version set. A typical version set may include a VMDK and all snaps of the VMDK. Files grouped in different version sets are not related by snaps and thus may not share blocks. Version sets are thus an effective mechanism for grouping files that may share blocks while separating files that may not.

The version set database 160 organizes the version sets of the file system 150. In an example, the version set database 160 includes an entry for each of the version sets VS-1 to VS-M and stores an identifier in connection with each version set of all files in the file system 150 that belong to the respective version set. The version set database 160 may store additional information about version sets, such as a count of all files in each version set, and/or other operationally useful information. Although FIG. 1 shows the version set database 160 as being included within the file system 150, this is not required. However, providing the version set database 160 within the file system 150 may confer numerous advantages, as will be addressed in connection with other figures.

In example operation, the hosts 110(1-N) issue IO requests 112(1-N) to the data storage apparatus 116 directed to files of the file system 150, such as files supporting VMDKs or their snaps. The SP 120 receives the IO requests 112(1-N) at the communication interfaces 122 and passes the IO requests to the IO stack 140. The IO stack 140 processes the IO requests 112(1-N), such as to effect read and/or write operations on the file system 150.

As the data storage apparatus 116 operates, the data storage apparatus 116 may update the files of the file system 150 and may take new snaps of those files. Each time the data storage apparatus 116 takes a new snap, the data storage apparatus 116 assigns the new snap to the version set of the new snap's parent, i.e., the file being snapped, such that the version set tends to grow. The new snap may initially share all of its data blocks with its parent, although write splitting may cause the contents of the two files to diverge over time. According to a snap retention policy in place (if there is one), the data storage apparatus 116 may also delete older snaps from the version set, thus tending to limit the rate of growth of the version set.

The use of version sets promotes efficiency in many file system operations. In one example, an administrative user of admin machine 102 may issue a request 104 to move a data block of storage used by the file system 150, e.g., as part of a file system reorganization process. Before moving the contents of the data block to a new location, the file system 150 may need to identify any block-sharing relationships in place on that data block, so as to ensure that moving the block does not disrupt any files that share the block. If the file system 150 has thousands of objects each having thousands of snaps, the process of checking all other files in the file system 150 for potential block sharing relationships would become exorbitant. Using the concept of version sets, however, only the files in one version set, as indicated by the version set database 160, need to be checked for block sharing. Files in other version sets cannot share the block and thus need not be checked. The scope of files that need to be checked for block-sharing relationships is thus reduced, potentially by orders of magnitude.

Figure 2A:
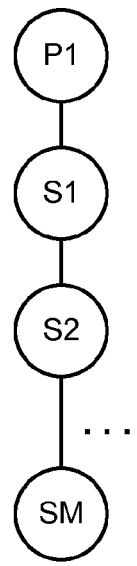
FIGS. 2a-2d are tree diagrams showing various examples of snap trees of files and showing example relationships among files within a version set.

FIGS. 2a though 2d show various examples of what is meant by a snapshot tree of files. As shown in FIG. 2a, file P1 represents a primary object, such as an actively accessible object, like a VMDK, and files S1 through SM represent a sequence of snaps of file P1 taken at successive times. For example, the data storage system 116 may take snap S1 of file P1 one day after the file system P1 first comes online. The data storage system 116 may then take snap S2 of P1 one day later, and so on, eventually taking snap SM of P1 M days after P1 first comes online.

Figure 2B:
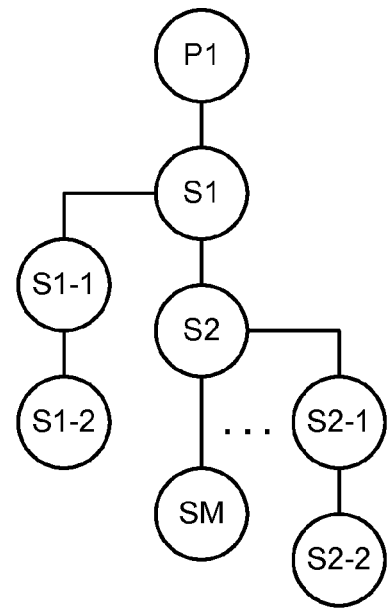

FIG. 2b shows a more complex example. Here, not only can the files P1 and S1 through SM be found, having the same relationships as shown in FIG. 2a, but also additional files are shown. S1-1 is a first snap of snap file S1, and S1-2 is a second snap of snap file S1. Also, S2-1 is a first snap file of snap S2, and S2-2 is a second snap file of snap file S2. Thus, a snapshot tree of files need not be limited to snaps of a primary object, but may also include snaps of other snaps, as well as snaps of those snaps, and so on.

Figure 2C:
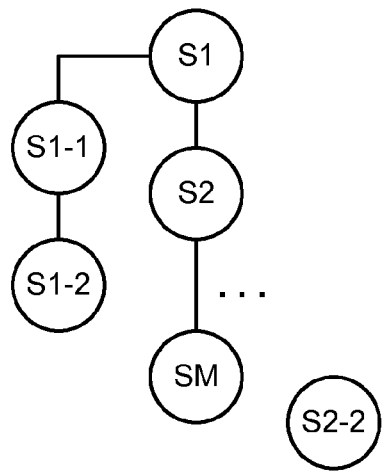
Figure 2D:

FIG. 2c shows essentially the same arrangement as in FIG. 2b, but here certain files have been deleted (P1 and S2-1). This example shows that a snapshot tree of files need not include a primary object at all and that holes can exist anywhere in the tree structure. FIG. 2d shows that a snapshot tree of files can include even a single file. This file can be a primary object, as shown, or a snap file.

Figure 3:
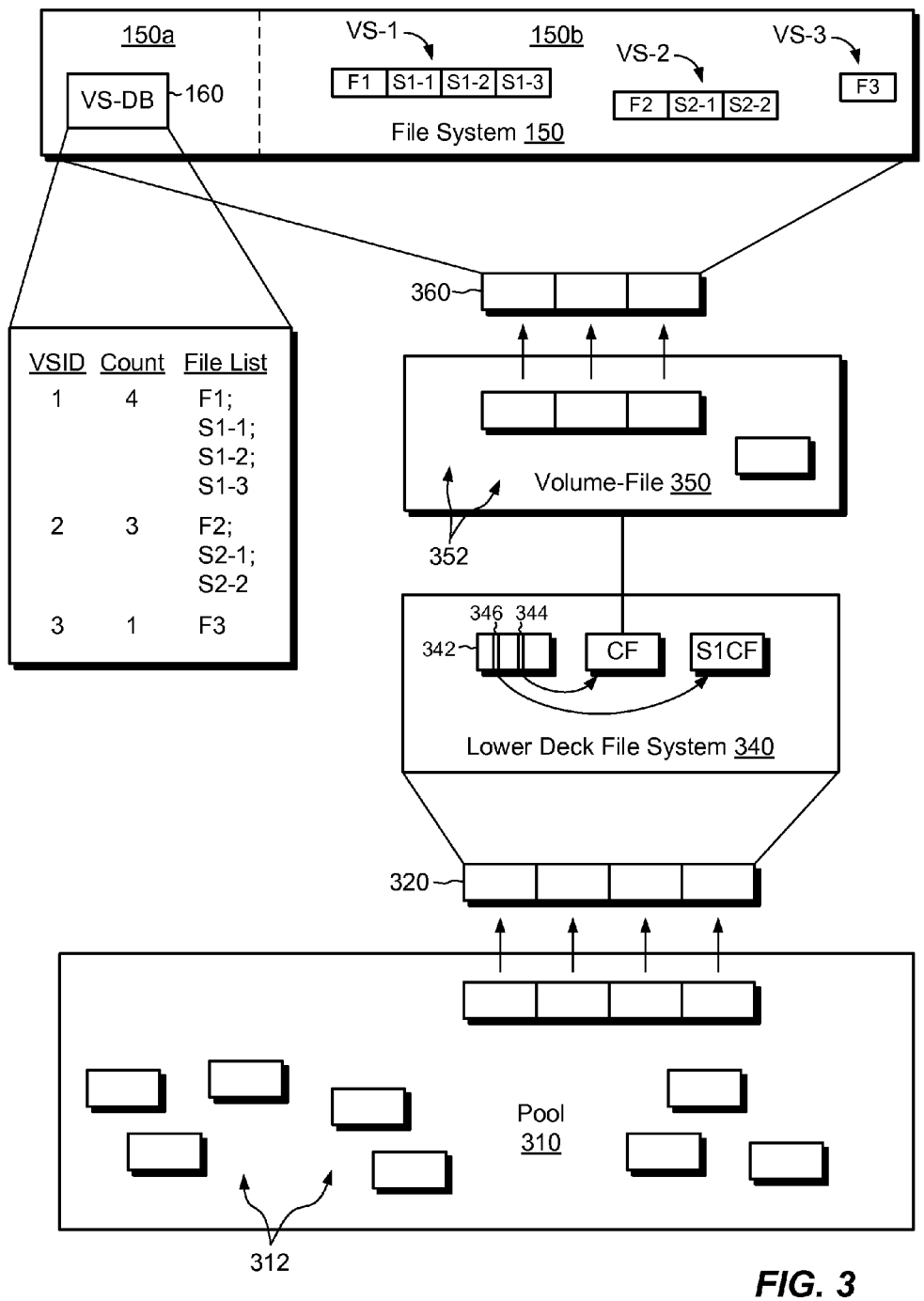
FIG. 3 is a block diagram showing a more detailed view of an IO stack with a version set database as shown in FIG. 1.

FIG. 3 shows an example implementation of the IO stack 140 of FIG. 1 in additional detail. Here, the file system 150 is seen to be built upon numerous layers. At the bottom can be seen a storage pool 310. The storage pool 310 manages a repository of storage units in the form of "slices" 312. In an example, slices 312 are formed from RAID (Redundant Array of Independent Disks) groups composed of multiple disk drives or solid state drives and/or the like, which are housed in the storage 180 (FIG. 1). In an example, each slice 312 provides 1 GB of storage space, which the IO stack 140 may provision on demand to fulfill storage requests. Here, it is seen that the IO stack 140 has provisioned four slices from the pool 310 to form a sparse metavolume 320, which provides a contiguous address space for supporting a lower-deck file system 340.

The lower-deck file system 340 is internal to the IO stack 140 and is generally hidden from users. In the example shown, the lower-deck file system 340 includes two files, a container file, "CF," and a snap of the container file, "S1CF." In general, container files like the container file CF store file-based realizations of data objects, such as LUNs, file systems, or vVOLs, for example. Container files thus tend to be quite large. A typical lower-deck file system 340 may contain only a single file (a container file), or may contain both a container file and any snaps of the container file, with the snaps of the container file representing snaps of the data object the container file realizes. In this example, CF is a file-based realization of the file system 150, and S1CF is a snap of the file system 150.

The lower-deck file system is further seen to include an inode table 342 having a first inode 344 for the container file and a second inode 346 for the snap. The inodes 344 and 346 each have a unique inode number in the lower-deck file system 340 and each include metadata describing the files to which they refer. Each inode also includes block pointers that point to data blocks of the sparse metavolume 320 where the file content of the respective files is stored.

The lower-deck file system 340 has a volume-based interface and expresses container files using volume-file abstractions. Here, volume-file 350 expresses container file CF with volume semantics (e.g., SCSI semantics). The volume file 350 also provides a local pool-like object for creating upper-deck slices 352, which the volume-file 350 may provision on demand to fulfill storage requests. Here, it is seen that three slices have been provisioned from the volume-file 350 to form an upper-deck sparse metavolume 360, which provides a contiguous address space for supporting the file system 150 (i.e., an upper-deck file system).

FIG. 3 also shows the file system 150 in additional detail. Here, for example, it is seen that the file system 150 includes a first region 150a, which is hidden from most users, and a second region 150b, which is visible to most users. The version set database 160 is located in the hidden region 150a. The expanded view of the version file database 160 shows version sets listed by version set identifier, VSID, with each VSID associated with a respective count and file list. The count represents the number of files in the version set and the file list provides the file names. In the example shown, which is kept small for clarity of illustration, a first version set (VS-1) includes four files, F1, S1-1, S1-2, and S1-3, which represent, in this case, an actively accessed first VMDK (F1) and its three snaps. A second version set (VS-2) includes 3 files, F2, S2-1, and S2-2, which represent an actively accessed second VMDK (F2) and its two snaps. A third version set (VS-3) includes only single file, F3, which represents a third VMDK. The third VMDK has no snaps in this example. The snaps shown in the file system 150 are upper-deck snaps that provide point-in-time versions of respective primary objects, here shown as files F1 and F2. Thus, while snaps in the file system 150 in this example are snaps of VMDKs, the snap S1CF in the lower-deck file system 340 is a snap of the entire file system 150, including all of its VMDKs, all snaps of all of its VMDKs, and the version set database 160. The files of the file system 150 may be organized in any suitable way. Also, although not shown in FIG. 3, the file system 150 also includes an inode table, with each inode of the inode table of the file system 150 storing metadata describing a respective file in the file system 150 and including block pointers pointing to data blocks in the upper-deck sparse metavolume 360 that store file data of the respective file.

Providing the version set database 160 within the file system 150, rather than outside the file system 150, attaches the version set database 160 to the version sets themselves and underlying files that they organize. This arrangement enables management of version sets to be self-contained within the respective file systems housing the version sets and thus promotes an efficient and modular organization of version sets in the data storage apparatus 116.

Figure 4:
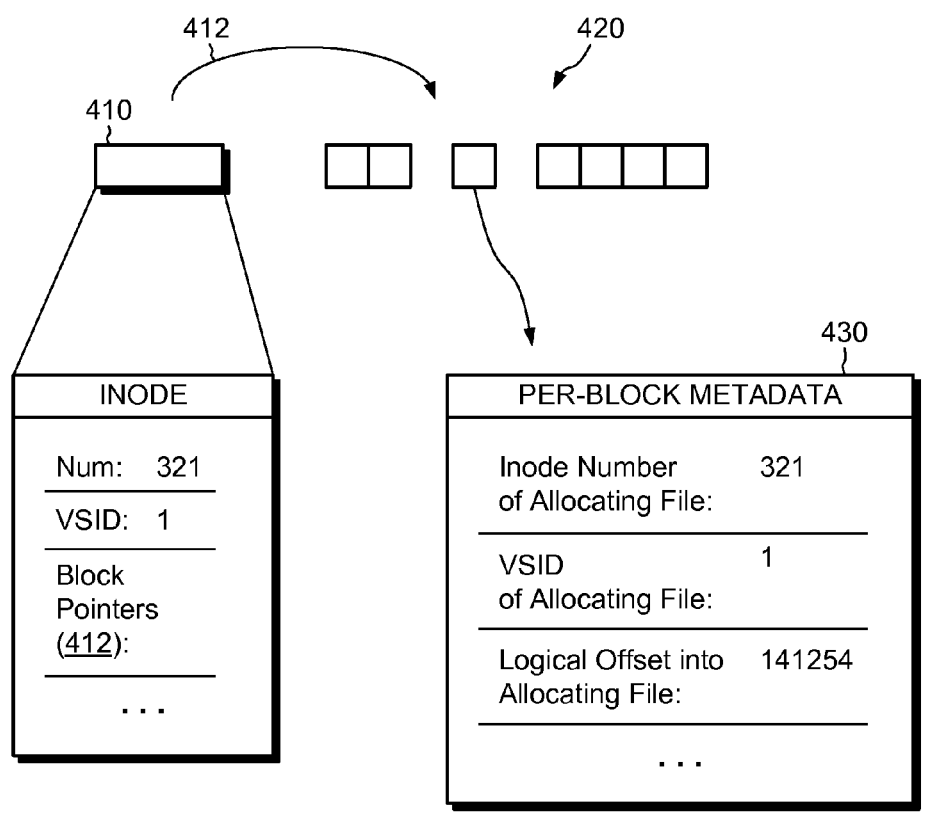
FIG. 4 is a block diagram showing an example structure of a file that belongs to a version set.

FIG. 4 shows an example file structure of a file in the file system 150. Here, the illustrated structure is that of file F1 in version set VS-1 (FIG. 3); however, the file structure shown may be typical of all files in version sets of the file system 150. The file structure of F1 is seen to include per-file metadata, e.g., an inode 410. The inode 410 includes block pointers 412 that point to data blocks 420. The data blocks 420 store file data of the file F1 and are addressable in the upper-deck sparse metavolume 360 (FIG. 3). The expanded view of the inode 410 shows it to include not only the block pointers 412 but also an inode number (321, which is unique within the file system 150), and a VSID (1). In this example, each file of the file system 150 supports the inclusion of a VSID in its inode. The VSID allows file system operations to readily identify the version set to which a file belongs without having to resort to multiple lookups and large amounts of metadata traffic. Including the VSID of a file in the file's inode thus promotes efficiency in file system operations that require access to the VSID. Although this example shows the VSID as a simple integer, e.g., "1" for VS-1, the VSID may alternatively be provided in the form of an inode number. As will be discussed, the inode number used for a VSID in a file's inode may be the inode number of a directory that groups together files of the version set to which the file belongs.

FIG. 4 also shows per-block metadata 430 of one of the blocks 420 of the file F1. The per-block metadata for a block, also referred to as block metadata or "BMD," stores a range of information about the block, including the VSID of the file that allocated the block. In this example, each data block used to store file data in the file system 150 supports the inclusion of a VSID in its per-block metadata. The VSID allows file system operations to readily identify the version set to which each block belongs and thus also promotes efficiency in file system operations that require access to the VSID. As described in connection with the VSID in the inode 410, the VSID stored in the per-block metadata 430 may alternatively be provided as an inode number pointing to a directory that organizes files of the version set of the file that allocated the block. The per-block metadata 430 may also store the inode number of the file that allocated the block (321, signifying that F1 allocated the block) and the logical offset of the block into the file that allocated the block (here, 141254).

Figure 5:
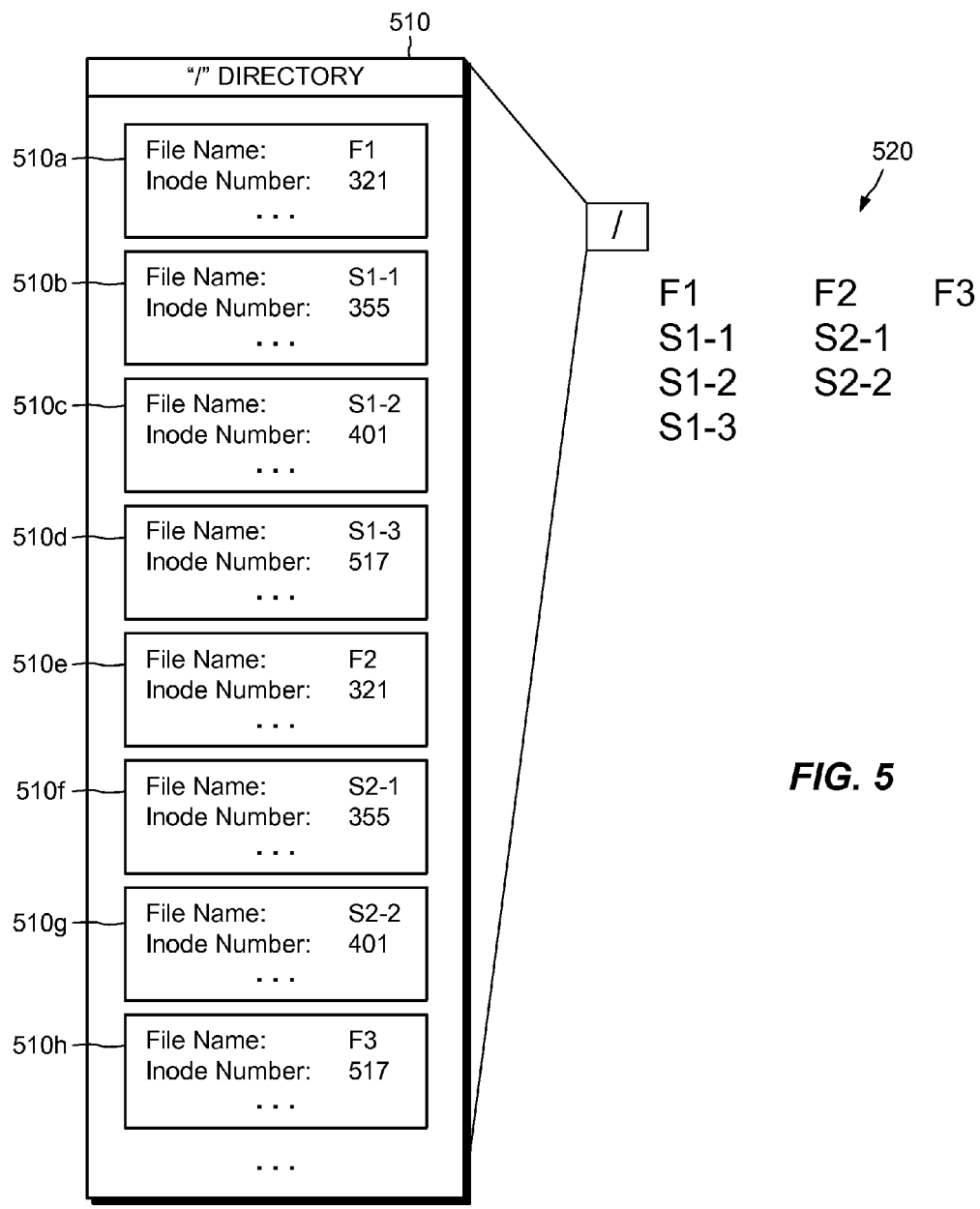
FIG. 5 is a diagram showing an example root directory of a file system of FIG. 1 that stores files for supporting multiple data objects and their respective snaps.

FIG. 5 shows an example organization of files of the file system 150 for supporting the VMDKs and their snaps. As shown in a directory listing view 520 to the right, the files supporting the VMDKs and their snaps are all located in a flat directory structure of the file system 150 in a root directory 510 (shown as "/"). The root directory 510 is itself a file of the file system 150. The expanded view of root directory 510 shows its example contents. Here, it is seen that the directory 510 includes directory entries 510a through 510h, each directory entry providing, among other information, a file name of the respective file in the directory 510 and the respective file's inode number. For example, the directory entry 510a stores file name "F1" (see also FIG. 3) and the inode number for F1 of "321" (from FIG. 4). Each file shown in the directory listing 520 has a corresponding entry in the directory 510. It is understood that the directory 510 and the listing 520 may include other files and sub-directories, which have been omitted here for sake of clear illustration.

Figure 6:
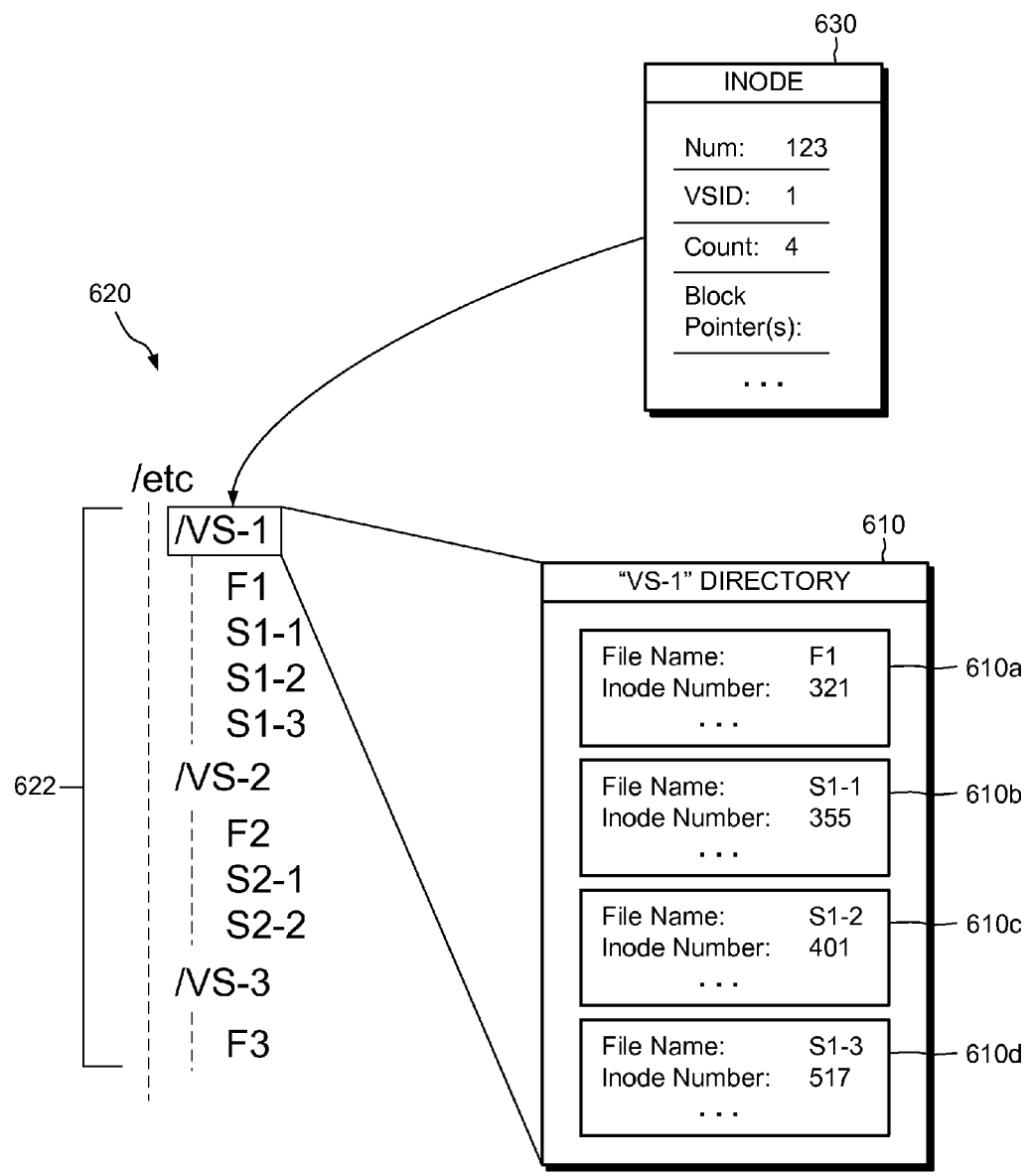
FIG. 6 is a diagram showing the version set database of FIGS. 1 and 3 implemented using an example directory structure in the file system of FIG. 1.

FIG. 6 shows an example implementation of the version set database 160 in the form of a directory structure 622. As shown in the directory listing view 620, the directory structure 622 that implements the version set database 160 may reside in a hidden directory, such as (but by no means limited to) the "/etc" directory. Here, and continuing with the example set forth in FIGS. 3-5, each version set (VS-1, VS-2, and VS-3) is represented as a directory (e.g., a sub-directory of "/etc") that includes all of the files that belong to the respective version set. For example, the directory NS-1 includes files F1, S1-1, S1-2, and S1-3, indicating the primary file F1 and all of its snaps. Likewise, the directory/VS-2 includes files F2, S2-1, and S2-2, indicating the primary file F2 and all of its snaps. The directory/ VS-3 includes file F3 and no snaps, as F3 has no snaps.

The expanded view of NS-1 shows contents of its directory file 610. Here, directory entries 610a through 610d are included for each of the respective files in directory NS-1. As with the directory entry examples shown in FIG. 5, each of the directory entries 610a through 610d includes a respective file name and inode number of the file whose name is listed. Although not shown, each version set has a directory file like the directory file 610. Thus, /VS-2 has a directory file that provides directory entries for files F2, S2-1, and S2-2, and/VS-3 has a directory file that provides a directory entry for F3.

It may be observed that the same files that appear in the directories NS-1, /VS-2, and/VS-3 in FIG. 6 also appear under the directory "/" in FIG. 5. In an example, the appearance of these files in both sets of directories is achieved through the use of hard links. As is known, a "hard link" is a directory entry for a file, in addition to an original directory entry, that may be located anywhere in a file system and that points to the same file as an original directory entry. Thus, while F1, for example, has an original directory entry 510a in the "/" directory 520, F1 also has a hard link 610a in the/FS-1 directory 610. Each of the files shown in the directory listing view 620 (excluding the directories) has an associated hard link. In some examples, the file names in the hard links shown in FIG. 6 may differ from the file names used for the same files as shown in FIG. 5. The version set database 160 may exploit this ability to assign names to files that allow simple navigation and indexing.

As further shown in FIG. 6, the directory 610 itself has an inode 630 within the file system 150. Like the inode 410 (FIG. 4), the inode 630 may also include the version set identifier (VSID). Here, however, the VSID is not the version set to which the directory 610 belongs, but rather the version set that the directory 610 organizes. In some examples, however, the VSID may be omitted from the inodes of directories that organize version sets. The inode 630 is further seen to include a count. The count, like the counts shown in FIG. 3, indicates the number of files in the version set (e.g., 4 for VS-1).

The above-referenced figures and accompanying descriptions have presented a novel infrastructure for efficiently managing file systems using the concept of version sets. Example processes that employ this novel infrastructure will now be described.

FIGS. 7-10 show processes 700, 800, 900, and 1000 that may be carried out in connection with the electronic environment 100. These processes are typically performed by the software constructs, described in connection with FIGS. 1-2, which reside in the memory 130 of the storage processor 120 and are run by the set of processing units 124. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

Figure 7:
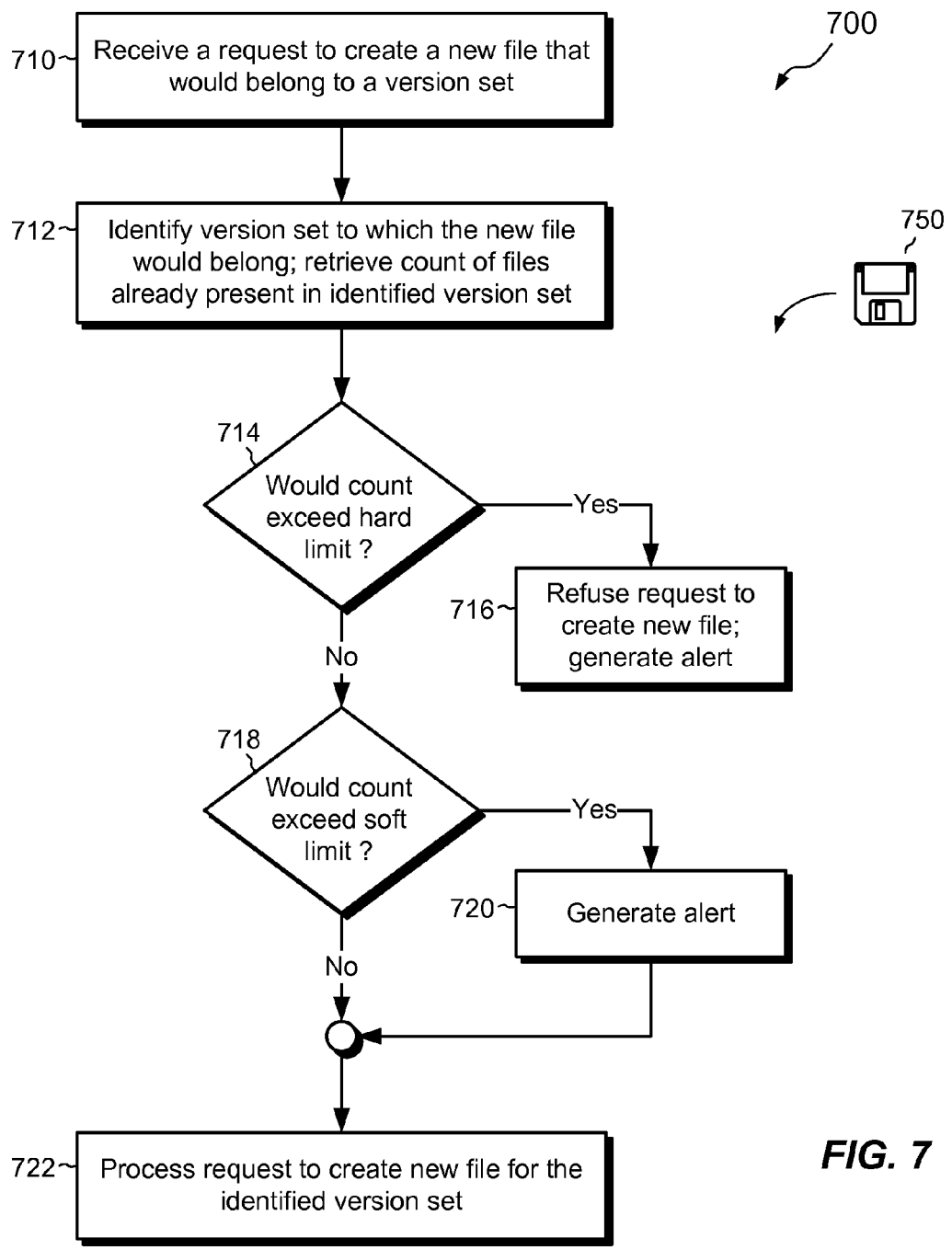
FIG. 7 is a flowchart showing an example process for limiting the number of files assigned to a version set.

FIG. 7 shows an example process 700 for limiting the number of files assigned to a version set. Limiting the number of files that are allowed to accumulate in each version set, or in selected version sets, helps to ensure that the full benefits of using version sets may be realized.

At 710, a request is received to create a new file. For example, the new file to be created may be a newly requested snap of a VMDK or other object, which a user or administrator may request explicitly or which the SP 120 may request automatically in accordance with a snap policy in place for the object. The new file, once created, would belong to a particular version set. For example, it is assumed that a version set has already been established that includes the VMDK or other object and its snaps (if there are any).

At 712, the SP 120 (or some other operating entity) identifies the version set to which the new file would belong. For example, the SP 120 may check the inode of the file being snapped (e.g., 410 of FIG. 4) to obtain the file's VSID. Alternatively, the SP 120 may perform a lookup on the file being snapped in the version set database 160. The SP 120 also obtains a count of the number of files in the identified version set. For example, the SP 120 performs a lookup on the identified VSID in the version set database 160 to obtain its associated count (FIG. 3). In some examples, performing the lookup in the version set database 160 involves interrogating the inode of the directory in the directory structure 622 that groups together the files of the identified version set (e.g., inode 630 of FIG. 6) and reading the count from the inode.

At 714, the count is interrogated to determine whether creating the new file would cause the count to exceed a predetermined hard limit. If creating the new file in the identified version set would cause the count for that version set to exceed the hard limit, then the SP 120 may refuse the request to create the new file (716). In some examples if the hard limit would be exceeded, the SP 120 generates an alert to report that the hard limit has been reached. The alert may take the form of an event log entry and/or a message to the host machine that requested creation of the new file (if there is one). Processing of the request to create the new file would then terminate at 716. If creating the new file would not cause the count to exceed the hard limit, the process 700 proceeds to 718.

At 718, the count is tested to determine whether creating the new file would cause the count to exceed a predetermined soft limit. The data storage apparatus 116 may specify a soft limit on the number of files allowed in any or each version set. In some examples, users and/or administrators establish soft limits explicitly. In other examples, soft limits are computed automatically, e.g., as predetermined percentages (e.g., 80%) of respective hard limits. If creating the new file would cause the count of files in its version set to exceed a soft limit, the SP 120 (or other operating entity) may generate an alert (720), e.g., in the manner described above.

At 722, the request to create the new file is processed and the new file is created. The new file then becomes part of the identified version set. In an example, the new file is created regardless of whether the soft limit is exceeded.

Figure 8:
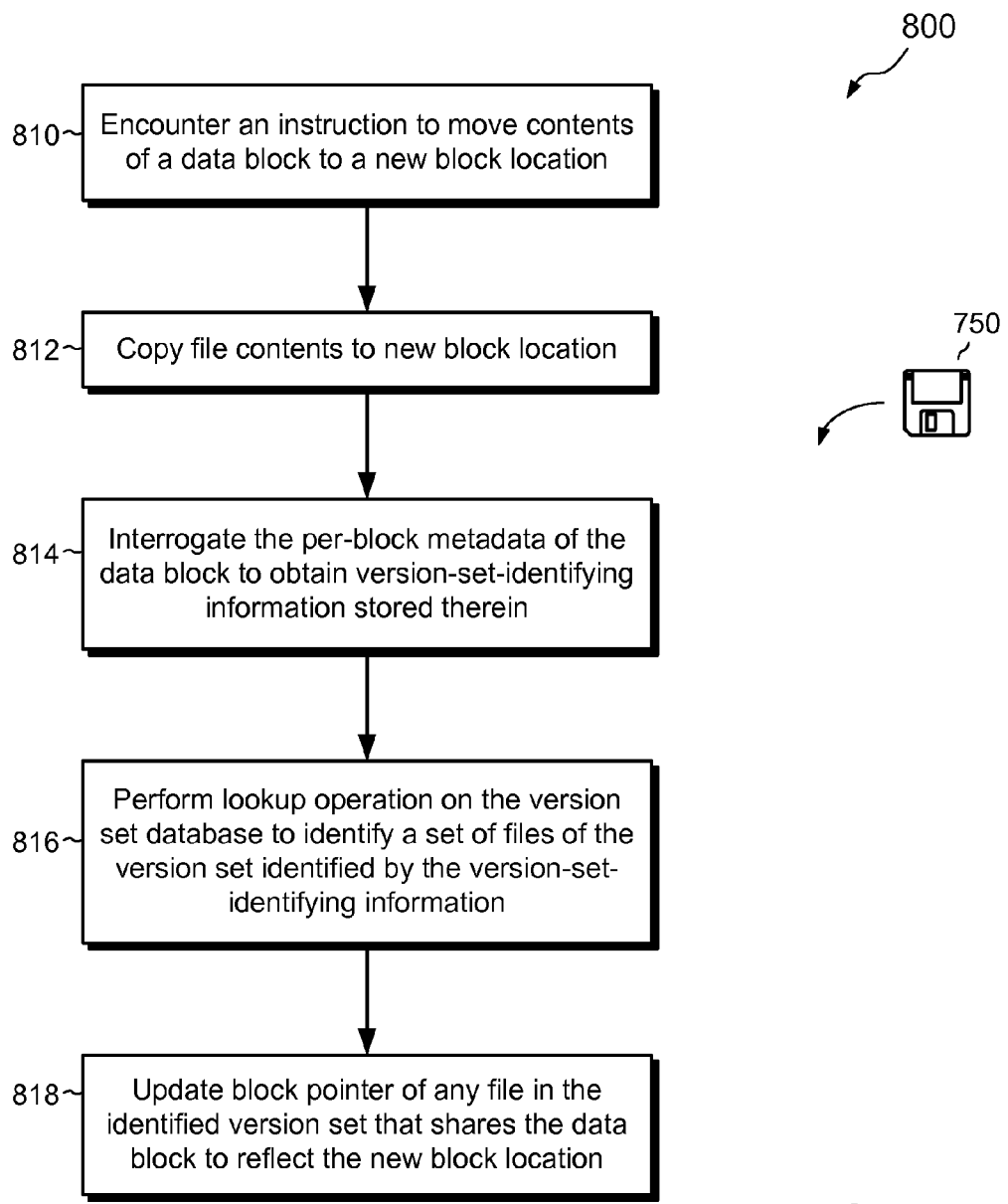
FIG. 8 is a flowchart showing an example process for using the version set database when moving a block used by the file system of FIG. 1.

FIG. 8 shows an example process 800 for using the version set database when moving contents of a block used by a file system to a new location. The process 800 may be performed, for example, during a storage reclaiming operation in which the data storage apparatus 116 moves contents of storage blocks to free up blocks consolidated in slices (e.g., slices 312 and/or 352 of FIG. 3). However, the process 800 may be performed in any context that involves moving block contents.

At 810, the SP 120 (or other operating entity) encounters an instruction to move the contents of a data block to a new block location. In an example, the data block is a block storing file data within the addressable space of the file system 150 (i.e., in the sparse metavolume 360 of FIG. 3).

At 812 (or at any suitable point), the SP 120 copies the contents of the block to be moved to the new block location.

At 814, the SP 120 interrogates the per-block metadata of the data block whose contents are to be moved to obtain the version-set-identifying information stored therein. For example the SP 120 interrogates the per-block metadata 430 (FIG. 4) of the block and retrieves the VSID for the block. The SP 120 may also obtain the logical offset into the file that allocated the block from the per-block metadata 430.

At 816, the SP 120 performs a lookup operation on the version set database 160 to identify a set of files of the version set identified at 812. For example, the SP 120 queries the database 160 on the retrieved VSID to obtain the corresponding file list (FIG. 3). In some examples, the retrieved VSID is the inode number of the directory that groups together the files of the identified version set and querying the version set database 160 involves interrogating the directory at that inode number. The directory resides in the directory structure 622 (FIG. 6). By interrogating the directory, the SP 120 obtains the inode numbers of all of the files listed as hard links in directory entries of the directory.

At 818, the SP 120 updates the block pointer of any file in the identified set of files that shares the data block to be moved to reflect the new block location. For example, the SP 120 checks the inode of each file listed in the directory entries above at the logical offset obtained from the per-block metadata 430. If the inode points to the block to be moved at the obtained logical offset, the SP 120 updates the pointer in the inode at the obtained logical offset to point to the new block location. The block to be moved may then be marked as freed.

The process 800 demonstrates how version sets can be used to reduce the scope of files that need to be checked for potential block sharing relationships when moving block contents. Thus, rather than having to check all files in the entire file system 150 for potential block sharing, the process 800 limits the files to be checked to those of a single version set.

Figure 9:
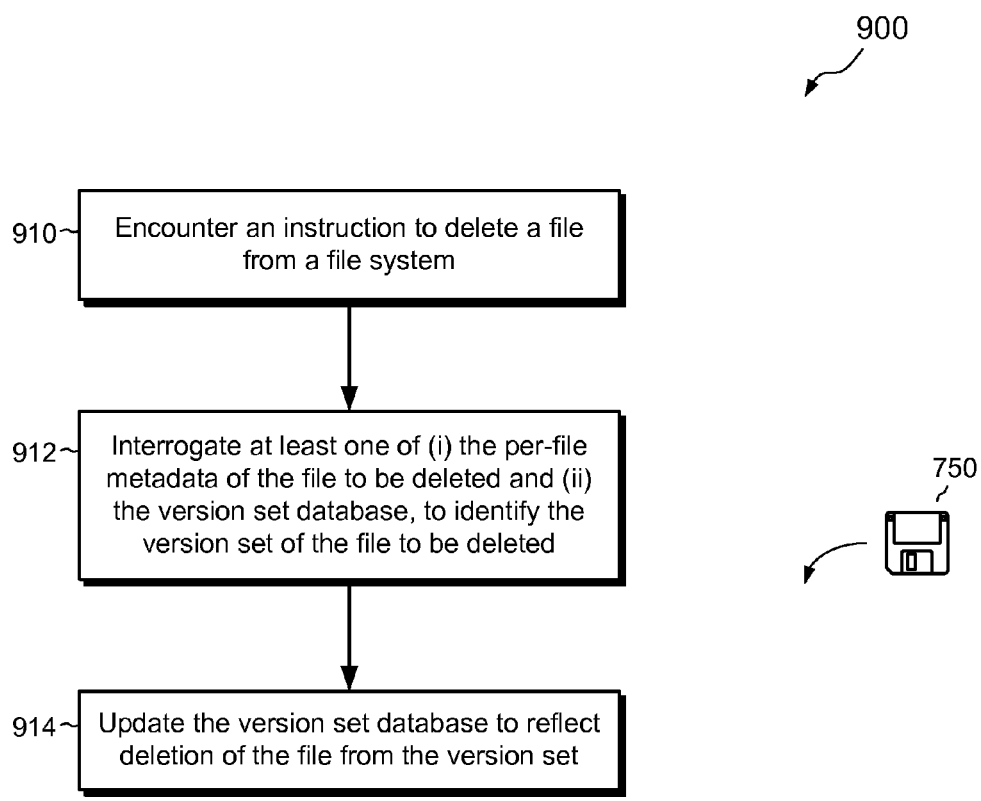
FIG. 9 is a flowchart showing an example process for using the version set database when deleting a file assigned to a version set.

FIG. 9 shows an example process 900 for using the version set database when deleting a file assigned to a version set. At 910, the SP 120 (or other operating entity) encounters an instruction to delete a file from a file system, e.g., file system 150.

At 912, the SP 120 interrogates at least one of (i) the per-file metadata 430 of the file to be deleted and (ii) the version set database 160, to identify the version set (VSID) of the file to be deleted. The SP 120 may use either means to obtain the VSID of the file to be deleted.

At 914, the SP 120 updates the version set database 160 to reflect the deletion of the file from the version set. For example, the SP 120 removes the file to be deleted from the file list in the database 160 (FIG. 3). In some implementations, the SP 120 removes the hard link for the file to be deleted from the directory for the version set (FIG. 6). In some examples, the file system 150 includes metadata (not shown) for tracking ownership of data blocks to particular version sets. In such examples, deleting the file may further include releasing an ownership share on blocks of the file to be deleted and returning the released ownership share back to the version set of the identified VSID. In this manner, ownership shares over blocks can be returned to version sets rather than to individual files.

Figure 10:
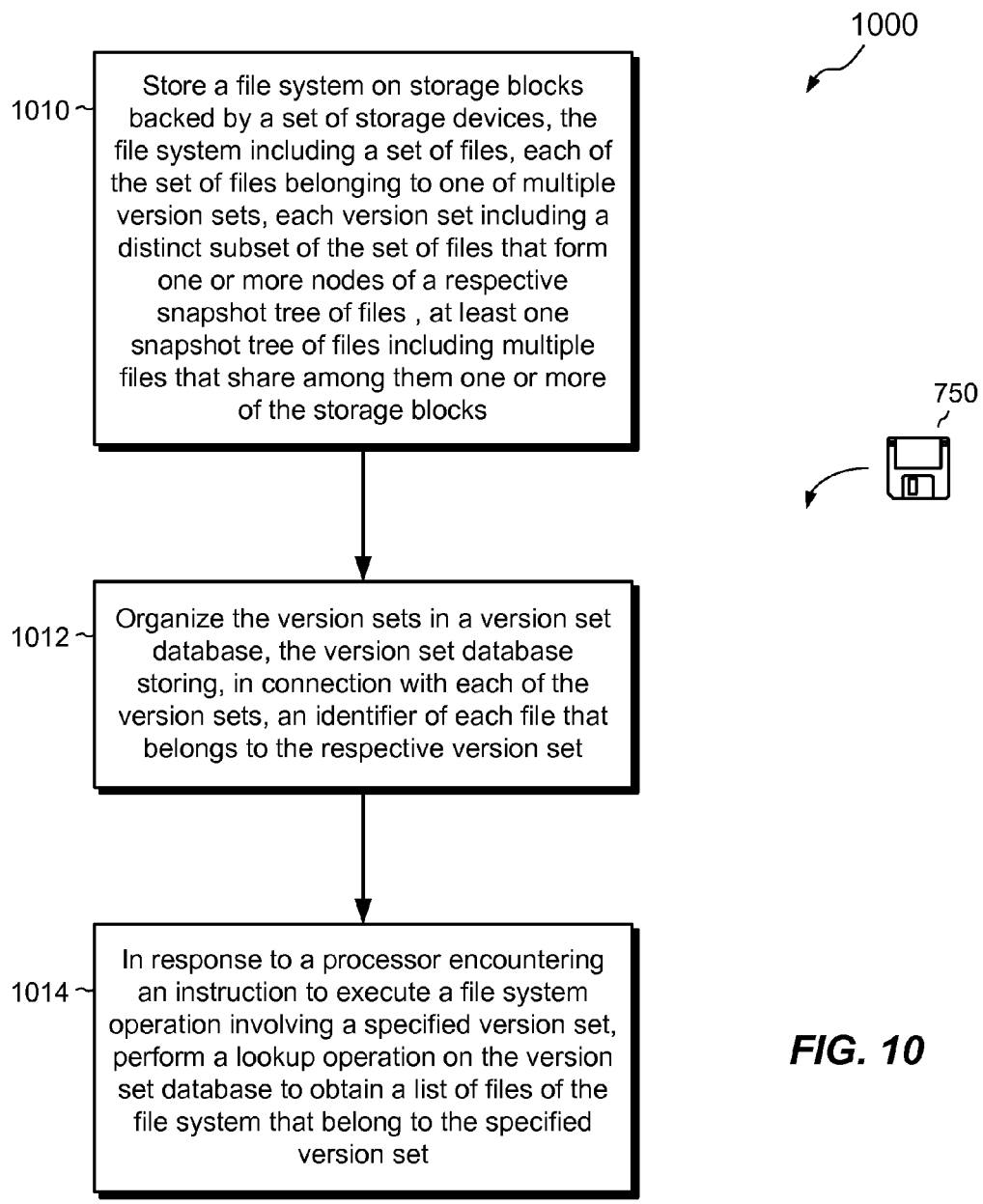
FIG. 10 is a flowchart showing an example process for managing file systems, such as the file system shown in FIG. 1.

FIG. 10 shows an example process 1000 for managing file systems, such as the file system 150, and provides a summary of many of the operations described above.

At 1010, a file system, such as file system 150, is stored on storage blocks (e.g., those that compose slices 312 and 352) backed by a set of storage devices (e.g., in storage 180), the file system including a set of files (e.g., those belonging to version sets VS-1, VS-2, and VS-3), each of the set of files belonging to one of multiple version sets (e.g., VS-1, VS-2, or VS-3), each version set including a distinct subset of the set of files that form one or more nodes of a respective snapshot tree of files (e.g., as shown in the non-limiting examples of FIGS. 2a-2d), at least one snapshot tree of files including multiple files that share among them one or more of the storage blocks. For example, any file in a given version set may share blocks with any other file of that version set but not with files in other version sets.

At 1012, the version sets are organized in a version set database (e.g., 160). As shown in FIG. 3, the version set database (e.g., 160) stores, in connection with each of the version sets, an identifier (VSID) of each file that belongs to the respective version set.

At 1014, in response to a processor encountering an instruction (e.g., 104) to execute a file system operation involving a specified version set, a lookup operation is performed on the version set database (e.g., 160) to obtain a list of files of the file system (e.g., 150) that belong to the specified version set.

An improved technique has been described for managing file systems. The technique assigns groups of related files in a file system (e.g., 150) to respective version sets (e.g., VS-1, VS-2, and VS-3). Each version set includes all files of the file system 150 that are related to one another by one or more snapshot operations, e.g., those of a respective snapshot tree of files as shown in FIGS. 2a-2d. A version set database 160 stores, in connection with each version set, an identifier (e.g., a file name in a file list and/or an inode number) of each file that belongs to the respective version set.

Having described certain embodiments, numerous alternative embodiments or variations can be made. For example, although per-file metadata 410 has been identified herein as a file's inode, this is merely an example. Alternatively, some other per-file metadata structure or structures may be used. Likewise, although per-block metadata 430 has been identified as BMD, another per-block metadata structure or structures may be used.

Also, although the use of version sets has been shown and described in connection with a particular IO stack 140 that represents the file system 150 in the form of a container file (CF, see FIG. 3), all embodiments do not require the IO stack 140. Rather, version sets may be employed in the context of any IO stack architecture that supports file systems containing files and snaps of files.

Also, the directory structure implementation of the version set database 160 need not include hard links. When implementing the version set database as a directory structure, other types of links may be used, including soft links, shortcuts, and the like.

Also, a particular example has been described involving a large number of VMDKs and their respective snaps. However, the techniques hereof are not limited to VMDKs or to any type or types of data objects.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIGS. 7-10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments. Those skilled in the art will therefore understand that various changes in form and detail may be made to the embodiments disclosed herein without departing from the scope of the invention.

What is claimed is:

1. A computer-implemented method for managing file systems, the method comprising:
   storing a file system on storage blocks backed by a set of storage devices, the file system including a set of files, each of the set of files belonging to one of multiple version sets, each version set including a distinct subset of the set of files that form one or more nodes of a respective snapshot tree of files, at least one snapshot tree of files including multiple files that share among them one or more of the storage blocks;
organizing the version sets in a version set database, the version set database storing, in connection with each of the version sets, an identifier of each file that belongs to the respective version set; and
in response to a processor encountering an instruction to execute a file system operation involving a specified version set, performing a lookup operation on the version set database to obtain a list of files of the file system that belong to the specified version set,
wherein the set of files of the file system include file data backed by a set of the storage blocks,
wherein the file system includes per-block metadata for each of the set of the storage blocks, and
wherein the method further comprises storing version-set-identifying information in the per-block metadata for each of the set of the storage blocks, the version-set-identifying information specifying a version set to which the respective block is allocated.

2. The method of claim 1, further comprising the file system storing per-file metadata for each of the set of files of the file system, the per-file metadata for each of the set of files including version-set-identifying information identifying the version set to which the respective file belongs.

3. The method of claim 2, wherein the version set database further stores, for each version set represented in the version set database, a count of files in the respective version set.

4. The method of claim 3, further comprising refusing a request to create a new file when creating the new file would cause the count of files for a version set to exceed a predetermined limit.

5. The method of claim 4, further comprising establishing a soft limit on the count of files for a version set, the soft limit being lower than the predetermined limit, and generating an alert when the count of files in the version set exceeds the soft limit.

6. The method of claim 2, wherein organizing the version sets in the version set database includes realizing the version set database in a directory structure of the file system, the directory structure including a set of directories, each of the set of directories assigned to a respective version set and grouping together files of the respective version set.

7. The method of claim 6, wherein organizing the version sets in the version set database further includes, in each of the set of directories, creating a hard link pointing to each file that belongs to the version set to which the directory is assigned, the file to which each such hard link points also being pointed to from another directory of the file system.

8. The method of claim 7, wherein each of the set of directories in the directory structure is itself a file of the file system having per-file metadata, and wherein the method further comprises storing a count of the number of files in each version set in the per-file metadata of the directory for the respective version set.

9. The method of claim 6, further comprising hosting the file system from a single container file of a lower-deck file system of a data storage apparatus.

10. The method of claim 9, further comprising taking a snap of the container file that hosts the file system, the snap providing a point-in-time version of the file system including all of the version sets and the version set database.

11. The method of claim 10, wherein each of the version sets includes a file realizing a virtual machine disk and multiple snaps of the file realizing the virtual machine disk.

12. The method of claim 6, further comprising:
the processor encountering an instruction to delete a file from the file system;
interrogating at least one of (i) the per-file metadata of the file to be deleted and (ii) the version set database, to identify the version set of the file to be deleted; and
updating the version set database to reflect deletion of the file from the version set.

13. The method of claim 6, further comprising:
the processor encountering an instruction to move contents of a data block of the set of the storage blocks to a new block location;
interrogating the per-block metadata of the data block to obtain the version-set-identifying information stored therein;
performing a lookup operation on the version set database to identify a set of files of the version set identified by the version-set-identifying information obtained from the per-block metadata; and
updating a block pointer of any file in the identified version set that shares the data block to reflect the new block location.

14. A computerized apparatus, comprising:
a set of processors; and
memory, coupled to the set of processors, the memory storing executable instructions, which when executed by the set of processors cause the set of processors to:
store a file system on storage blocks backed by a set of storage devices, the file system including a set of files, each of the set of files belonging to one of multiple version sets, each version set including a distinct subset of the set of files that form one or more nodes of a respective snapshot tree of files, at least one snapshot tree of files including multiple files that share among them one or more of the storage blocks;
organize the version sets in a version set database, the version set database storing, in connection with each of the version sets, an identifier of each file that belongs to the respective version set; and
in response to a processor encountering an instruction to execute a file system operation involving a specified version set, perform a lookup operation on the version set database to obtain a list of files of the file system that belong to the specified version set,
wherein the set of files of the file system include file data backed by a set of the storage blocks,
wherein the file system includes per-block metadata for each of the set of the storage blocks, and
wherein the executable instructions further cause the set of processors to store version-set-identifying information in the per-block metadata for each of the set of the storage blocks, the version-set-identifying information specifying a version set to which the respective block is allocated.

15. A computer-program product including a set of non-transitory computer-readable media having instructions which, when executed by a set of processors of a computerized apparatus, cause the set of processors to perform a method for managing file systems, the method comprising:
storing a file system on storage blocks backed by a set of storage devices, the file system including a set of files, each of the set of files belonging to one of multiple version sets, each version set including a distinct subset of the set of files that form one or more nodes of a respective snapshot tree of files, at least one snapshot tree of files including multiple files that share among them one or more of the storage blocks;

organizing the version sets in a version set database, the version set database storing, in connection with each of the version sets, an identifier of each file that belongs to the respective version set; and in response to a processor encountering an instruction to execute a file system operation involving a specified version set, performing a lookup operation on the version set database to obtain a list of files of the file system that belong to the specified version set, wherein organizing the version sets in the version set database includes realizing the version set database in a directory structure of the file system, the directory structure including a set of directories, each of the set of directories assigned to a respective version set and grouping together files of the respective version set.

16. The computer-program product of claim 15, wherein organizing the version sets in the version set database further includes, in each of the set of directories, creating a hard link pointing to each file that belongs to the version set to which the directory is assigned, the file to which each such hard link points also being pointed to from another directory of the file system.

17. The computer-program product of claim 16, wherein each of the set of directories in the directory structure is itself a file of the file system having per-file metadata, and wherein the method further comprises storing a count of the number of files in each version set in the per-file metadata of the directory for the respective version set.

18. The computer-program product of claim 15, wherein the method further comprises hosting the file system from a single container file of a lower-deck file system of a data storage apparatus.

19. The computer-program product of claim 15,
wherein the set of files of the file system include file data backed by a set of the storage blocks,
wherein the file system includes per-block metadata for each of the set of the storage blocks, and
wherein the method further comprises storing version-set-identifying information in the per-block metadata for each of the set of the storage blocks, the version-set-identifying information specifying a version set to which the respective block is allocated.

* * * * *